(12) United States Patent
Ritter

(10) Patent No.: US 6,332,579 B1
(45) Date of Patent: Dec. 25, 2001

(54) IDENTIFICATION CARD BILLING METHOD USING AN IDENTIFICATION CARD

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/581,396
(22) PCT Filed: Dec. 17, 1997
(86) PCT No.: PCT/CH97/00472
    § 371 Date: Jun. 13, 2000
    § 102(e) Date: Jun. 13, 2000
(87) PCT Pub. No.: WO99/31868
    PCT Pub. Date: Jun. 24, 1999
(51) Int. Cl.[7] ................................................. G06K 19/06
(52) U.S. Cl. .......................................... 235/492; 379/144
(58) Field of Search ............................ 379/144; 235/492, 235/382

(56) References Cited

U.S. PATENT DOCUMENTS
5,748,720 * 5/1998 Loder .................................... 379/144

FOREIGN PATENT DOCUMENTS
| | | |
|---|---|---|
| 0 556 597 | 8/1993 | (EP) . |
| 0 656 733 | 6/1995 | (EP) . |
| 0 689 368 A1 | 12/1995 | (EP) . |
| 0 689 368 B1 | 12/1995 | (EP) . |
| 0 724 371 | 7/1996 | (EP) . |
| 0 770 953 | 5/1997 | (EP) . |
| 526118 * | 2/1993 | (FR) . |
| 2 680 261 | 2/1993 | (FR) . |
| WO 95/28062 | 10/1995 | (WO) . |
| WO 96/11545 | 4/1996 | (WO) . |

OTHER PUBLICATIONS
"GSM: Digital Cellular Telecommunications Systems (Phase 2+); Specification of the SIM Application Toolkit for the Subscriber Identity Module—Mobile Equipment ( SIM –ME ) Interface" GSM Technical Specification, Jul. 1997, pp. 1–5, 07, 09–56, XP002064640 see paragraph 6.4.12.

(List continued on next page.)

Primary Examiner—Harold I. Pitts
(74) Attorney, Agent, or Firm—Pillsbury Winthrop LLP

(57) ABSTRACT

Billing method for billing a call by a subscriber identified with a SIM card (10) in a telecommunications system (2) to said subscriber, comprising:
  Determination of the duration of the call by means of a time-measuring device (100) integrated into the SIM card (10);
  Evaluation of the amount to be billed based upon the determined call duration and at least one tariff table stored in the SIM card (10).

The tariff tables are stored in a tariff server (6), and can be remotely loaded into the SIM card (10) through said telecommunications network (2).

Advantages: since all data for determining the invoiced amount are available on the SIM card, the billing takes place at the user directly at the source. No other billing system is required in the infrastructure.

39 Claims, 2 Drawing Sheets

OTHER PUBLICATIONS

"GSM: Digital Cellurar Telecommunications Systems (Phase 2+); Specification of the SIM Application Toolkit for the Subscriber Identify Module –Mobile Equipment ( SIM –ME ) Interface" GSM Technical Specification, Jul. 1997, Seiten 1–5, 07, 09 –56, XP002064640.

"Digital Cellular Telecommunications System (PHASE 2+); Specification of the Subscriber Identity Module—Mobile Equipment (SIM–ME) Interface" GSM Technical Specification (GSM 11.11), Dec. 1995, p. 4, line 11.

I. Brini et al., "International Roaming in Digital Cellular Networks", CSELT Technical Reports, vol. XX, No. 6, Italy, Dec. 1992, pp. 531–536 (specification, p. 5, line 28 and ff).

I. Brini et al., "European Roaming Related Technical Problems", CSELT Technical Reports, vol. XX, No. 3, Italy, Jun. 1992, pp. 209–215 (specification, p. 5, line 1 and ff.).

* cited by examiner

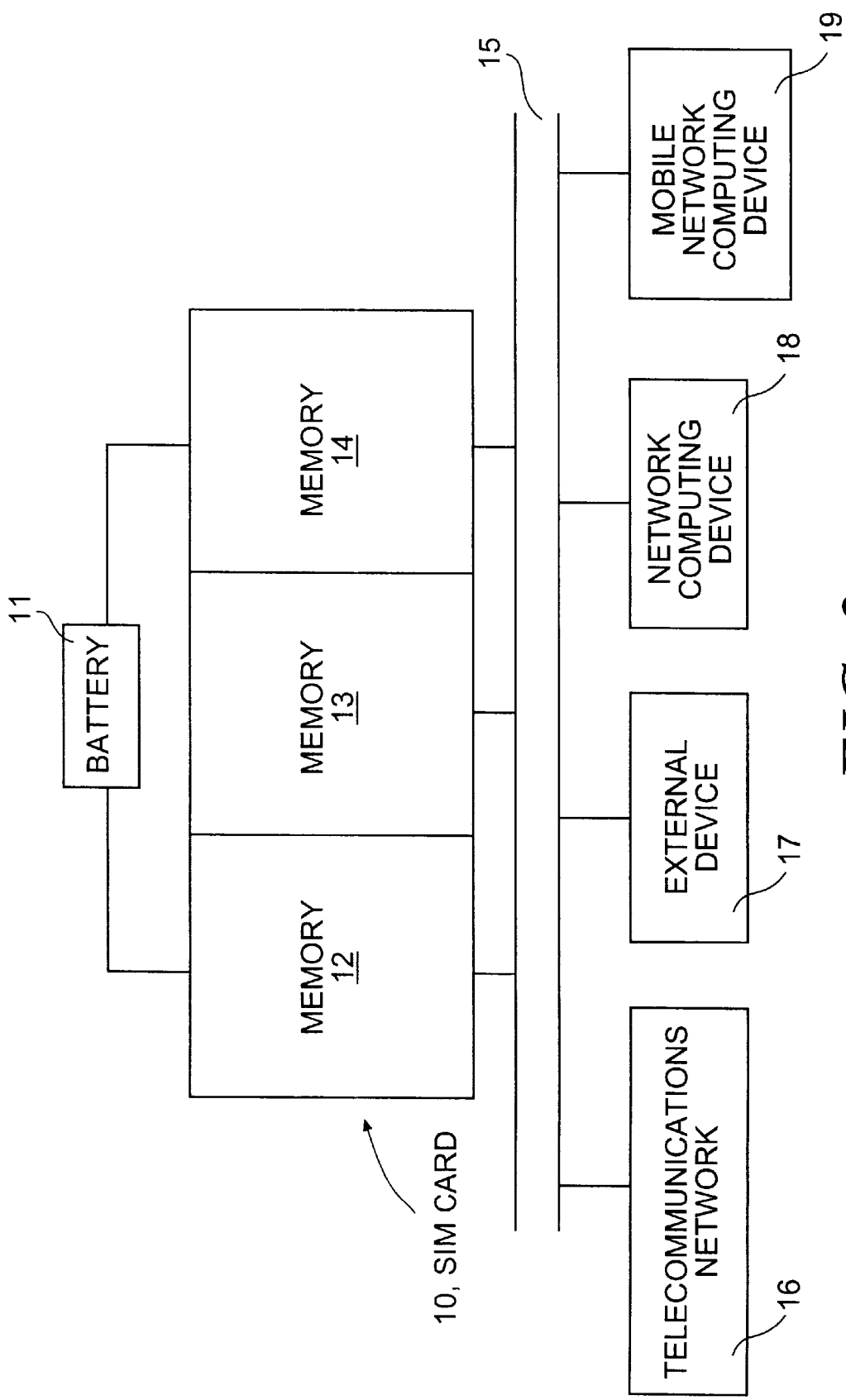

IDENTIFICATION CARD BILLING METHOD USING AN IDENTIFICATION CARD

This application is the national phase of international application PCT/CH97/00472.

BACKGROUND OF THE INVENTION

This invention relates to a billing method in a telecommunications system. The invention relates more specifically, but not exclusively, to a billing method which can be carried out with an identification card, as well as to an identification card.

In telecommunications networks, for example in telecommunications networks based on the GSM standard, the amount charged for a call depends upon various parameters, in particular the time of day, and, among other things, the geographic location of the calling and the called subscriber. These parameters, in particular the duration of the call, are established in the infrastructure of the network, for example in a central control office. The amount to be charged is then determined on the basis of these parameters, and is debited against an account of the subscriber at the network operator or at a financial institution. This billing method is extremely time-consuming and expensive for the network operator, and requires a complex billing system and many manual or semi-automatic operations.

In addition to this post-paid billing method, prepaid systems are also known. Prepaid systems usually use a subscriber-specific identification card, including an account which can be loaded with a monetary amount. The amounts billed for calls of the subscriber are then debited from this account after each call. Various methods are known by which money can be loaded again onto the account. The parameters needed to determine the amounts billed are known by the term CAI (Charge Advice Information), and are established in a server administered by the network operator, and are transmitted to the identification card of the subscriber with signalling messages. Processing means in the card then indicate the amount billed on the display of the mobile device in the local currency, and debit this amount from the stored monetary amount.

Described in the patent application WO 95/28062 are a method and a SIM card for carrying out a prepaid system. According to the disclosed teaching of WO 95/28062, so-called charge advice information ("e"-parameters) according to the GSM standard are transmitted to a respective mobile device, and are further transmitted to the SIM card when a call is established by the mobile device, which card checks whether the stored prepaid amount is sufficient for the incoming or outgoing call. If the amount is sufficient, the procedures for establishing the call are concluded, according to WO 95/28062, and a timer of the SIM card (or of the mobile device) is started to measure the duration of the call. According to WO 95/28062, the call costs are determined from the measured duration of the call as well as based on tariff information, which is stored in the SIM card or which is transmitted to the mobile device via the network by means of further charge advice information, and the costs are deducted from the prepaid amount. According to WO 95/28062, special charge advice information can be transmitted periodically to the mobile device over the network while the call is established, which charge advice information is acknowledged by the SIM card if the prepaid amount still suffices to continue the call.

Prepaid billing methods are inexpensive for the network operator, who does not have to write any invoice. He still has to carry out the evaluation of the amounts to be charged, however. Moreover this method can be applied in the GSM sphere only with devices and in geographic locations where the Advice of Charge (AOC) function, defined in standard ETSI ETS300 510 (corresponding to the technical specification GSM 02.24), can be applied. Therefore prepaid cards usually allow only very limited roaming possibilities.

Prepaid methods are also known in connection with intelligent network (IN) solutions. These methods are expensive to use, however, and can only be applied in the network of the respective operator.

Described in the patent application WO 96/11545 is a smart card comprising a clock and a calendar, both of which are connected to a microprocessor which, for its part, is connected to a memory. According to the teaching disclosed in WO 96/11545, this smart card is inserted in a subscriber unit, and a subscriber identity as well as a period of validity, during which the subscriber unit is to use the subscriber identity and the smart card can no longer be used, are communicated to the subscriber unit.

Described in the patent application EP 0 724 371 A is a method by means of which a wireless communication terminal can select the preferred network from among at least two wireless networks, the least expensive network typically being selected based on network tariff information which is stored in a centralized server environment.

OBJECTS OF THE INVENTION

It is therefore an object of the invention to propose an improved billing method, which does not have the drawbacks of the known methods, in particular a billing method simplified for the network operator.

These objects are attained with the method described in the independent claim, various variants being described in the dependent claims.

Moreover these objects are attained with an identification card as described in the independent identification card claim and with a system as described in the independent system claim.

SUMMARY OF THE INVENTION

The billing method according to the invention is carried out with an identification card for subscribers in a telecommunications network, which can be inserted in a removable way in a terminal device, and which contains at least one tariff table, with which the amounts to be charged can be determined on the basis of call duration, as well as an integrated time-measuring device, with which the duration of the call can be established, in addition to conventional data processing means enabling the storing of data including at least identification data, (IMSI (International Mobile Subscriber Identity), MSISDN (Mobile Station Identity Number) or IDUI (International Debit User Identification)), of the user in the telecommunications network.

In this way all the parameters necessary for determination of the amount billed can be established directly on the card, so that billing can take place directly at the source, at the subscriber.

The determined amount can then either be debited directly from a prepaid account on the identification card and/or be packed in a billing record and be transmitted to a debiting server in the telecommunications network.

The patent document EP 0 656 733 describes a billing system for mobile devices, in which calling parameters necessary to determine the amount billed are stored in the memory of the mobile device. This amount can then be shown, for information, on the display of the mobile device. Not described in this document, however, is how the determined amount can be automatically debited. Moreover the duration and time of the call are determined with the aid of the internal clock of the mobile device. The network operator has no influence upon the accuracy of the clock in mobile devices offered by other producers. Furthermore in most mobile devices this clock can be set by the subscriber. The patent document FR 2680261 describes a telephone chipcard, which contains a prepaid account as well as tariff tables. The amounts billed for calls are charged to a prepaid account on the basis of call length and stored tariffs. The time and the duration of calls are not established, however, using a clock integrated into the card, but rather in an external device.

A SIM card with a continuous measuring device is already known from WO96/11545. This card can only be used for an amount of time loaded in a timer in the card. This document does not describe, however, how the amounts to be billed can be automatically debited to the subscriber.

EP 0 770 953 describes another chipcard with an integrated clock, which cannot be used, however, for signing electronic documents, and cannot be used for billing of calls.

BRIEF DESCRIPTION OF THE DRAWINGS

The present invention will be better understood with the aid of the description, given by way of example and illustrated with these figures:

FIG. 2 is a block diagram of a SIM card according to the invention.

DESCRIPTION OF THE PREFERRED EMBODIMENT

Figure 1:
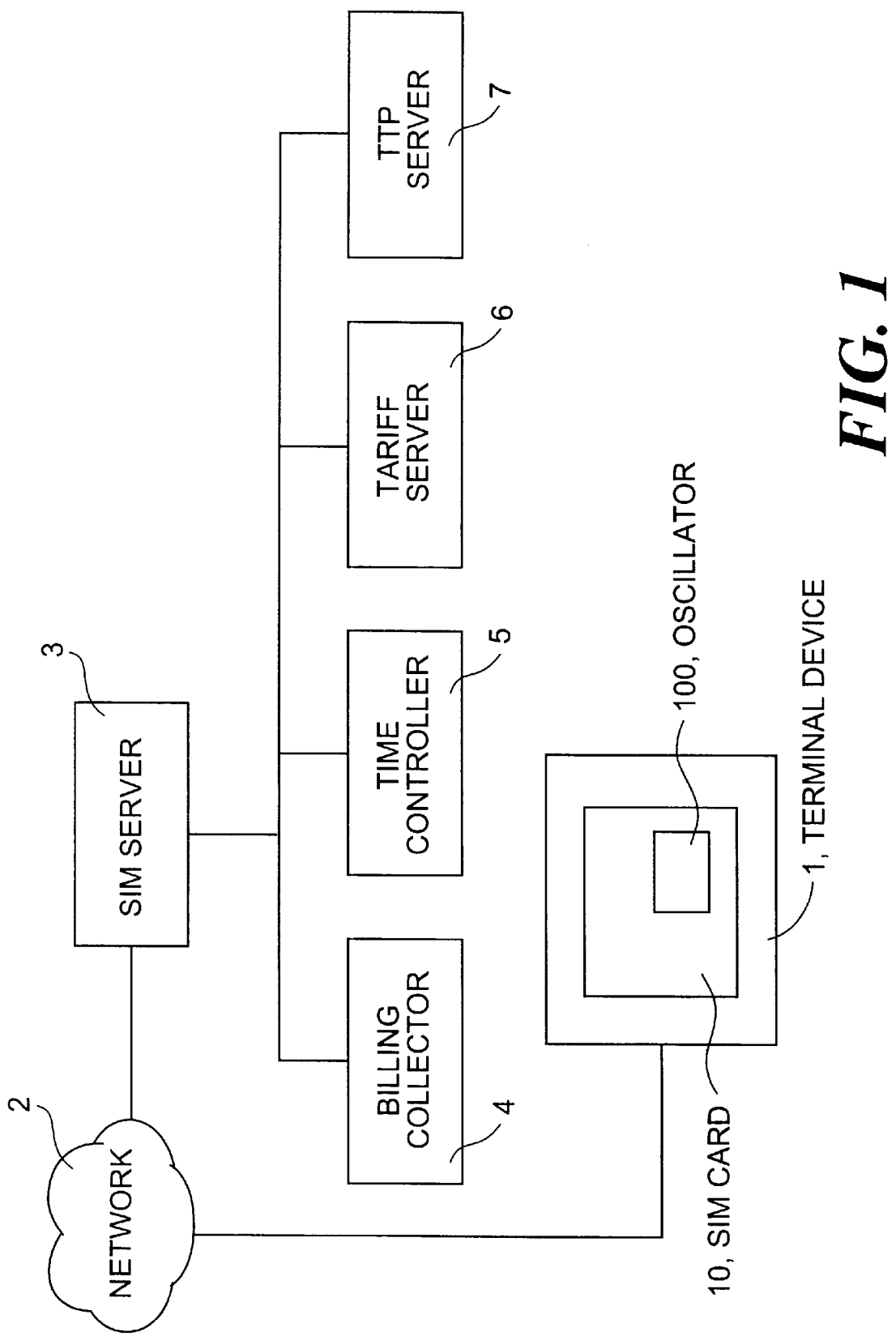
FIG. 1 is a block diagram of a system according to the invention.

Designated by the reference numeral 1 is a terminal device, for example a GSM mobile telephone, or a computer with communications possibilities. The terminal device 1 contains an identification card 10, for example a SIM card 10 (Subscriber Identity Module), which identifies the subscriber in the telecommunications network 2. SIM cards are already being used in, among other things, GSM, DCS or PCS mobile devices, or will be used soon also in fixed networks with subscriber identification through chipcards. The SIM card can be either a full-sized card or a plug-in card; it is connected to the terminal 1 by means of a contact area on the surface of the card. Other card formats and contactless cards, however, can also be used within the framework of this invention. The SIM card 10 contains data processing means, for example a known GSM-SIM microcontroller. SIM cards are described, for example, in the technical specification GSM 11.11 and GSM 11.14, available from the Secretariat of the European Telecommunications Standards Institute, F-06921 Sophia Antipolis, France, since 1995, or respectively 1996. Other identification cards, for example multipurpose cards known under the designation Opencard, can also be used in this invention.

The SIM card contains moreover known means to transmit and receive SMS short messages, and preferably known filter means to recognize and interim store special short messages, preferably according to the SICAP method, which is described in the patent EP 0 689 368 B1, among other sources. The SIM card can preferably also communicate with other devices in the network 2 through unstructured special services data (USSD) in the signalling data link. Encryption and signing means are preferably available moreover in order to decrypt received files and to encrypt and sign transmitted files. The TTP (Trusted Third Party) method can be used as the encryption method, for example, or also encryption means working according to a point-to-point (PTP) method.

According to the invention, the SIM card further comprises an integrated time-measuring device 100, with which the duration of the calls can be determined. The time-measuring device can contain hardware and/or software means. In a preferred variant, however, the time-measuring device comprises an electronic oscillator of any type, for example a quartz oscillator. When the terminal device is switched off, the oscillator 100 is preferably supplied by an energy store (accumulator battery or capacitor), contained in the card 10.

The SIM card 1 is connected to a telecommunications network 2, for example a GSM network, when it is inserted into the terminal device 1. A SIM server 3 is likewise connected to the network 2, and can communicate through special SMS messages and/or through USSD over the network 2. Known filter means in the server 3 and in the SIM cards 10 allow special services to be carried out, such as the exchange of data, instructions and programs between the SIM server and a SIM card. The SIM server 3 is preferably connected moreover to a TTP server 7, in order to encrypt and sign the communications with the SIM cards 10. It is thereby ensured that the confidentiality, authenticity of identity, authenticity of information, integrity and indisputableness of origin of the various messages are ensured. A point-to-point encryption and signing method can, however, also be used.

The SIM server 3 is likewise connected to a time controller 5, which sets and controls the time-measuring device integrated into the SIM card 10, as will be described further below. A tariff server 6 sets and controls the tariff table integrated into the SIM card. A billing collector 4 collects the billing records generated in the SIM cards 10, sorts them according to financial services provider, and transmits them to the respective financial services providers, as will be described further below.

The communication between the various servers 3 to 7 and the SIM cards 10 takes place, as already mentioned, through the telecommunications network 2, in this example a GSM network. The roaming possibilities established in the GSM system then permit the billing method according to the invention to be used in all networks which have a roaming agreement with the home network. This method can then be used in all the GSM900, GSM1800, and also DCS1900 single networks connected by roaming agreement, as explained later. The invention can also be used, however, with non-GSM networks.

The roaming methods are described, for example, by I. Brini et al. In "International Roaming in Digital Cellular Networks," *CSELT Technical Reports*, Volume XX, No. 6, Italy, December 1992, pages 531–536, or by the same authors in "European Roaming-related Technical Problems," *CSELT Technical Reports*, Volume XX, No. 3, Italy, June 1992, pages 209–215.

FIG. 2 shows schematically the architecture of the identification card 10.

The card is preferably supplied by an accumulator battery 11, as already mentioned. A microcontroller with data processing means carries out the various processes in the card. A memory, preferably an EEPROM, is contained in the microcontroller or is connected to it. The memory contains programs and files which are preferably organized in a hierarchical directory. Files and resources in this memory can be grouped into three areas 12, 13, 14. The first area 12 is a to protected area, and contains data and components which the subscriber cannot change. In addition to the conventional GSM data and programs, TTP data and programs, as well as at least one private and/or at least one public key are contained in this group. Also contained in this area, according to the invention, are registers and programs to control the integrated time-measuring device as well as is tariff tables, tariff calculation programs and record generation programs.

In this first area 12, data and programs can only be loaded, or respectively changed, by means of a cryptographic process. Using this process Java programs can also be transferred into the area 12 of the card.

The second area 13 is not protected, the subscriber can access all data and programs in this area. Besides a telephone book, containing all the telephone numbers frequently called by the subscriber, this area also contains various user programs and data, for example Java programs which can be remotely loaded.

The third, optional area 14 contains data and programs responsible for the direct, contact less connection of the SIM card 10 to external devices. This contactless connection can take place, for example, inductively through a coil integrated into t he card or into the mobile device, or by means of an infrared interface in the housing of the mobile device 1.

The additional identification parameters stored in one of the areas 12,13, 14 enable the SIM card 1 to also be used as an identification card for another system, for example as an identification card in another telecommunications network 16, for an external device 17, in a network computing device NC 18, in a mobile Network Computing device MNC 19, or with all other conceivable devices, where subscriber identification using a chipcard is applicable. These various other systems can access the needed identification parameters in the areas 12, 13, 14 with a virtual SIM bus 15. The access can be achieved either through an interface with contacts, for example through the contact surface on the surface of the card, or in a contactless way through one of the above-mentioned infrared or inductive interfaces.

We shall now describe more closely the billing method used with this identification card.

When the SIM card 10 is inserted into the mobile device 1, the program first checks in the protected area 12 of the card whether the time-measuring device 100 is set. If that is not the case, the card 10 sends a time query message to the time controller 5, which is answered by means of a time record. The time record comprises a time indication, and is preferably transmitted by the SIM server 3 in the user information channel so that the transmission time is kept as short as possible. In a variant, the time record is transmitted as a USSD message though the signalling layers of the communications protocol. Because the transmission time of SMS messages cannot be foreseen, time records are preferably not transmitted through this channel, however.

Transmission time compensations can be determined from statistical evaluations and can be used. The time record is preferably signed by the TTP server 7, so that a forger cannot transmit any falsified time records to manipulate the time set. The SIM card 10 receives the signed record, checks the signature, and if this is correct, sets the time-measuring device with the transmitted and compensated time.

Preferably other mechanism are further provided to correct the set time in the SIM card 10. For example, the time controller 5 can periodically check the set time, and, if necessary, generate a time record of the correction. Since, as is explained later, the SIM card 10 generates billing records and/or CDRs (Call Detail Records), which always include a time indication, the transmitted time can be checked, in a variant, so that the time-measuring device 100 can be reset if a time deviation is established statistically. In any case it is important that the time-measuring device 100 is continually set at the correct time in the relevant time zone. For this purpose, it can be provided for that the time-measuring device is set each time the SIM card 10 is logged into a new telecommunications network. In a variant, the time controller 5 transmits a time record to the SIM card 10 each time the mobile device 1 is switched on. In another variant, the mobile device determines its current geographic position after each logging in, and carries out the time zone correction itself with the aid of a time zone table stored in the card.

Parallel to this process, a check is also made, upon logging in of the mobile device, as to whether the tariff table stored in area 12 is up to date and complete. To this end, upon logging into the home network or into a visited network, a record is transmitted to the tariff server 6 in the home network where the current version of the tariff table is stored. If the tariff table in the SIM card 10 is no longer up to date, or if it has to be supplemented, a tariff record is generated by the tariff server 6, is encrypted and signed by the TTP server 7, and is transmitted through the SIM server 3 and the communications network 2 to the SIM card 10. The SIM card 10 then checks the signature of the received tariff record, and, if the signature is correct, the stored tariff table is supplemented or adjusted.

This tariff transmission procedure can also be used each time the network operator adjusts the tariffs and changes his tariff tables in the tariff server 6. In this case, the tariff server can automatically transmit the new tariffs to all its subscribers (initializing and updating of the tariff tables).

Since the memory capacity of the SIM card 10 is not unlimited, preferably no complete tariff list is stored, but instead only the tariffs for telecommunications areas in which the subscriber frequently phones, based on statistics, and, optionally, tariffs for some pre-defined telecommunications areas. For example, stored in a new identification card are only the tariffs for calls within the home network, or only tariffs for calls between the home network and some neighboring networks. If the subscriber then logs into another network with his mobile device, then tariff tables for calls out of, and into, this new network are additionally stored in this identification card 10, according to the mechanism described above.

User-specific discount parameters can be associated with the stored tables so that a user can profit individually from corresponding discounts according to his use behavior. Discounts can be set up as desired according to various criteria. For example, a network operator can program discount parameters in SIM cards of employees in large enterprises or can also load them later.

The tariff table version, which can be used as a subsequent statistical control, is preferably transmitted in the billing records, described further below. For the case where it is established later that the version used for billing was not the correct version, the current table of tariffs is conveyed to the SIM card 10, and a correction is made according to the mechanism described above.

We shall now describe how the billing is carried out for a call.

In establishing a connection, the call number is analyzed by a suitable program in the protected area 12 of the identification card 10. If the necessary tariff figures for the targeted region are to be found in the tariff table on the card 10, the connection is actually completed. If the needed table elements are not available on the card, establishment of the call is preferably blocked and an updating record is sent to the tariff server in order to load these data.

The parameters needed to analyze the amount to be billed are collected after signalling of the call set up. The amount to be billed depends, among other things for example, on the duration of the call, the time of day, the day of the week, the location of the calling subscriber (A) and of the called subscriber, the tariff tables, and, if applicable, any possible user-specific discounts. All these parameters are either available in the protected area 12 of the identification card, or can be determined using the integrated time-measuring device 100. Determination of the amount to be billed can thus take place after completion of the call, as a function of the duration of said call established by the time-measuring device, using a suitable program in the protected memory area 12. This amount is then preferably shown on the display of the mobile device 1, and is packed into a billing record, provided with a TTP signature, and is conveyed through the telecommunications network 2 to the billing collector 4. In a variant, instead of the established amount on the card, the parameters needed for its calculation such as duration of the call, time, etc., are conveyed to the billing collector.

If the connection is interrupted in such a way that the billing record cannot be conveyed, it is stored in the protected area 12 of the SIM card, and is sent to the billing collector 4 the next time the card 10 is used. New connections are blocked until the last signed billing record has been correctly transmitted to the billing collector.

Optionally, the billing records are stored in a stack in the protected area 12 of the card. Several billing records are then sent to the billing collector 4 at the same time, or are called up by the billing collector as needed.

If the SIM card 10 is a prepaid card, and contains a stored monetary amount, the billed amount is preferably charged directly to this account. Prepaid cards are described in the patent application EP96810570.0, among other sources. In this case billing records in the billing collector 4 are used only for checking and for statistics.

If the card is not a prepaid card, the billing records are sorted in the billing collector 4 according to financial services provider, and are conveyed to the respective financial services provider. This financial services provider sends the subscriber a bill or debits his account. Possible financial services providers are, for example, the network operators themselves, or also a bank, a credit card company or other collection points. Since the billing records already represent a billing section, the network operator no longer needs to administer any billing system of his own.

Since all the elements for a statement of charges are available in the billing record, they can be made available to the subscriber, for example, via Internet or by post. Billing records are TTP-encrypted and signed, as already mentioned. It is thus ensured that only the entitled subscriber can access his statement of charges.

One skilled in the art will note that prepaid and post-paid billing systems according to the invention can be used in parallel in the same telecommunications system.

Parallel to the billing records generated on the SIM cards, conventional CDRs (Call Detail Records) are preferably generated in the infrastructure of the GSM network which are used for checking the billing records and for further statistics.

This method can be used not only to bill calls of the user of the SIM card., but also to bill use of other resources on the card 10. In principle, using this method, all operations can be billed for which all the billing parameters are available on the SIM card 10. For example, use of the programs stored in the memory area of the card or use of the inductive or infrared interface can also be billed, for example as a function of the duration of use.

This billing method can be used in any network which is connected to the home network of the subscriber through a roaming agreement. The area of application, therefore, is not limited to a home GSM network; use is possible globally in all telecommunications networks, independently of the network structure. The method can also be used with communications systems other than the GSM system.

This billing method can be used by several network operators. In this case each network operator preferably has his own tariff server 6. The various tariff servers are preferably connected to one another, however, so that tariff adjustments need only to be carried out once internationally. In a variant, all tariff tables are stored in a master tariff server to which all network-specific tariff servers are able to have access in order to determine their tariffs. In a further variant, all network operators access the same tariff server 6, administered by all. The administration of the network-specific tariffs in the tariff server can be carried out by the individual network operators through a cryptographically-protected process.

These processes can be protected and used confidentially only if an encrypted and protected data transmission channel exists between the SIM card and the SIM server. This encryption can be achieved with TTP functions or also using point-to-point algorithms, as already mentioned.

What is claimed is:

1. Billing method for billing a call by a subscriber identified with an identification card (10) in a telecommunications network (2) to this subscriber, comprising:

determination of the duration of the call, the duration of the call being measured by a time-measuring device (100) integrated into the identification card (10), determination of the amount to be billed based upon the determined call duration and at least one tariff table stored in the identification card (10), wherein a time controller (5) checks the time set in the identification card (10), and, if the time is not set correctly, transmits a time record to this identification card, and the amounts to be billed depend upon the time of day determined by said time-measuring device (100).

2. Billing method according to claim 1, wherein the tariff tables are stored in a tariff server (6), and can be remotely loaded into the identification card (10) and/or changed through said telecommunications network (2).

3. Billing method according to claim 2, wherein the tariff tables can be communicated from said tariff server (6) by means of special SMS short messages.

4. Billing method according to claim 3, wherein the tariff tables can be communicated from said tariff server (6) by means of USSD data.

5. Billing method according to claim 2, wherein after an identification card (10) has been logged into a telecommunications network (2) the tariff server (6) checks the version of the tariff table stored in this identification card (10), and, if necessary, loads the most recent version onto this identification card.

6. Billing method according to claim 1, wherein, after each logging in of an identification card (10), the time controller (5) checks the time set, and, if the time is not set correctly, transmits a time record to this identification card.

7. Billing method according to claim 1, wherein the transmitted time records are electronically signed.

8. Billing method according to claim 1, wherein stored in the identification card (10) of the subscriber are only the tariffs for areas of the telecommunications network in which he has already called and optionally tariffs for some predefined areas of the telecommunications network.

9. Billing method according to claim 2, wherein the transmission of tariff tables (10) between said tariff server (6) and the identification card (10) is encrypted.

10. Billing method according to claim 2, wherein the transmission of tariff tables (10) between said tariff server (6) and the identification card (10) is signed.

11. Billing method according to claim 1, wherein the amounts to be billed depend upon the location of the calling subscriber.

12. Billing method according to claim 1, wherein the amounts to be billed depend upon the location of the subscriber being called.

13. Billing method according to claim 1, wherein the amounts to be billed depend upon possible discounts.

14. Billing method according to claim 1, wherein said time-measuring device (100) comprises an oscillator integrated into the identification card (10).

15. Billing method according to claim 14, wherein said oscillator is a quartz oscillator.

16. Billing method according to claim 1, wherein the determined amounts are debited directly against a prepaid account in the identification card (10).

17. Billing method according to claim 1, wherein parameters upon which the billed amounts depend, are packed in billing records and are delivered to a billing server in said telecommunications network (2).

18. Billing method according to claim 17, wherein the billing records are electronically signed.

19. Billing method according to claim 18, wherein the billing records transmitted to the billing server are sorted and are transmitted to a corresponding financial services provider.

20. Billing method according to claims 17, wherein call detail records (CDRs) are generated in the telecommunications network (2), parallel to the billing records, as a check.

21. Billing method according to claims 1, wherein the use of resources not responsible for the traffic/communication processing are also billed in the identification card (10) on the basis of the stored tariff tables and said time-measuring device.

22. Identification card (10) for subscribers in a telecommunications network, which can be inserted in a terminal (1) in a removable way, containing:

data processing means, which make possible the storage of data containing at least identification data of the subscriber in the telecommunications network (2), at least one tariff table, the amounts to be billed being determined on the basis of the determined call duration and this tariff table, an integrated time measuring device (100), with which the duration of the calls is determined, wherein the identification card (10) comprises means to receive time records, comprising time indications, transmitted to the identification card (10) by a time controller (5), and to set the time measuring device (100) with the transmitted time, and registers and programs for control of the time-measuring device (100) are stored in an area (12) of the identification card (10) not accessible to the subscriber.

23. Identification card (10) according to claim 22, wherein at least one tariff table is stored in the EEPROM of the identification card (10), and can be remotely loaded from a tariff server (6) in the telecommunications network (2) and/or changed.

24. Identification card (10) according to claim 23, wherein it can recognize and load tariff tables in special SMS short messages.

25. Identification card (10) according to claim 23, wherein it can recognize and load tariff tables in USSD data.

26. Identification card according to claim 22, wherein stored are only the tariffs for areas of the telecommunications network in which the subscriber has already called and optionally tariffs for some predefined areas of the telecommunications network.

27. Identification card according to claim 22, wherein it further contains TTP-decryption means in order to decrypt received tariff tables.

28. Identification card according to claim 22, wherein said time-measuring device (100) comprises an oscillator integrated into the identification card (10).

29. Identification card (10) according to claim 28, wherein said oscillator is a quartz oscillator.

30. Identification card according to claim 22, wherein it contains a prepaid account, against which the billed amounts are debited directly.

31. Identification card according to claim 22, wherein it contains means to pack the amounts to be billed in billing records and to send them to a billing collector (4) in said telecommunications network (2).

32. Identification card according to claim 22, wherein call detail records (CDRs) are generated as a check, parallel to the billing records, in the telecommunications network (2), capable of roaming.

33. Identification card according to claim 22, wherein it contains means to bill in the identification card, on the basis of said tariff tables and said time-measuring device (100), also the use of resources not responsible for traffic/communication processing.

34. Identification card according to claim 22, wherein it further comprises an energy store (11) which supplies the time-measuring device (100).

35. Telecommunications system in which the subscribers are identified with an identification card (10), with a multiplicity of terminal devices (1) in which identification cards (10) can be removably inserted, at least certain identification cards (10) having at least one tariff table, whereby at least certain identification cards (10) further contain an integrated time-measuring device (100), with which the duration of calls is determined, and whereby the billed amounts are determined for at least certain calls of these subscribers on the basis of said determined duration and said tariff tables, wherein it further contains a time controller (5) with which the time can be set in the time-measuring devices (100) integrated into the identification cards (10), the time determined in the time controller (5) being communicated to the identification cards (10) with time records.

36. Telecommunications system according to claim 35, wherein it further comprises a tariff server (6) in which the tariff tables are stored, as well as an SIM server (3), with which the tariff tables can be remotely loaded into the identification cards (10) through said telecommunications network (2).

37. Telecommunications system according to claims 35, wherein it further contains a TTP server (7) with which data transfers with the identification cards (10) can be signed and encrypted.

38. Telecommunications system according to claim 35, wherein it further contains a billing collector (4) which collects the billing records generated by the various identification cards (10).

39. Telecommunications system according to claim 38, wherein the said billing collector (4) sorts the received billing records according to financial services provider and transmits them to the corresponding financial services provider.

* * * * *

UNITED STATES PATENT AND TRADEMARK OFFICE
CERTIFICATE OF CORRECTION

PATENT NO.   : 6,332,579 B1
DATED        : December 25, 2001
INVENTOR(S)  : Ritter, Rudolf It is certified that error appears in the above-identified patent and that said Letters Patent is hereby corrected as shown below:

<u>Title page,</u>
Item [73], Assignee, please change "Swisscom AG" to -- Swisscom Mobile AG --

Signed and Sealed this

Twenty-fifth Day of March, 2003

JAMES E. ROGAN
*Director of the United States Patent and Trademark Office*